United States Patent
Allen

(10) Patent No.: US 9,530,007 B1
(45) Date of Patent: Dec. 27, 2016

(54) IDENTIFYING TAMPER-RESISTANT CHARACTERISTICS FOR KERNEL DATA STRUCTURES

(71) Applicant: Amazon Technologies, Inc., Reno, NV (US)

(72) Inventor: Nicholas Alexander Allen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 118 days.

(21) Appl. No.: 14/469,200

(22) Filed: Aug. 26, 2014

(51) Int. Cl.
  *G06F 12/14*  (2006.01)
  *G06F 21/57*  (2013.01)

(52) U.S. Cl.
  CPC .......... *G06F 21/577* (2013.01); *G06F 12/145* (2013.01); *G06F 2212/151* (2013.01); *G06F 2221/034* (2013.01)

(58) Field of Classification Search
  CPC   G06F 11/00; G06F 11/1446; G06F 15/17331; G06F 21/805; G06F 3/0604; G06F 11/3447; G06F 2201/815; G06F 2201/865; G06F 11/006; G06F 11/0075; G06F 11/0778; G06F 21/54; G06F 21/577; G06F 11/3692; G06F 21/602; G06F 2212/1052; G06F 21/572; G06F 21/00; G06F 21/56; G06F 2212/151; G06F 12/145; G06F 2212/152
  See application file for complete search history.

(56) References Cited

U.S. PATENT DOCUMENTS

| | | | |
|---|---|---|---|
| 6,167,425 A | 12/2000 | Beckhoff | |
| 7,373,520 B1 | 5/2008 | Borthakur et al. | |
| 7,904,278 B2 | 3/2011 | Wilson et al. | |
| 8,327,059 B2 | 12/2012 | Chen et al. | |
| 8,583,891 B1 | 11/2013 | Spangler et al. | |
| 8,645,950 B2 | 2/2014 | Fries et al. | |
| 8,745,308 B2 | 6/2014 | Chen et al. | |
| 8,949,797 B2 | 2/2015 | Aaraj et al. | |
| 8,950,007 B1 | 2/2015 | Teal et al. | |
| 2004/0117620 A1 | 6/2004 | Rothrock | |
| 2005/0005101 A1 | 1/2005 | Yenduri | |
| 2005/0091365 A1 | 4/2005 | Lowell et al. | |
| 2005/0223362 A1* | 10/2005 | Whitlock | G06F 11/3672 717/126 |
| 2006/0015732 A1 | 1/2006 | Liu | |

(Continued)

OTHER PUBLICATIONS

Carbone et al., "Mapping Kernel Objects to Enable Systematic Integrity Checking," Proceedings of the 16th ACM Conference on Computer and Communications Security, Nov. 9-13, 2009, Chicago, Illinois, 11 pages.

*Primary Examiner* — Hashem Farrokh
(74) *Attorney, Agent, or Firm* — Davis Wright Tremaine LLP

(57) ABSTRACT

Techniques for identifying tamper-resistant characteristics for kernel data structures are disclosed herein. A set of kernel data structures is received, the set based on an operating system kernel. A plurality of virtual machines are instantiated based on the operating system kernel, each virtual machine of the plurality of virtual machine instances based on one or more modifications to one or more values to the virtual machine, the modifications based on the kernel data structures. Those modifications which cause virtual machine failures indicate which kernel data structures may be tamper-resistant.

20 Claims, 10 Drawing Sheets

(56) References Cited

U.S. PATENT DOCUMENTS

| | | |
|---|---|---|
| 2006/0242406 A1 | 10/2006 | Barde et al. |
| 2008/0320594 A1 | 12/2008 | Jiang |
| 2009/0006862 A1 | 1/2009 | Alkove et al. |
| 2010/0223613 A1* | 9/2010 | Schneider ............ G06F 9/45558 718/1 |
| 2010/0325628 A1* | 12/2010 | Haga ..................... G06F 21/575 718/1 |
| 2011/0047621 A1 | 2/2011 | Brando et al. |
| 2011/0283358 A1 | 11/2011 | Cochin et al. |
| 2011/0321166 A1 | 12/2011 | Capalik et al. |
| 2012/0011501 A1 | 1/2012 | Filali-Adib et al. |
| 2012/0311341 A1 | 12/2012 | Paris et al. |
| 2013/0047150 A1 | 2/2013 | Malasky et al. |
| 2014/0215461 A1* | 7/2014 | Laor ................... G06F 9/45533 718/1 |
| 2014/0298338 A1* | 10/2014 | Doi ...................... G06F 9/4856 718/1 |
| 2014/0372717 A1 | 12/2014 | Ciu et al. |

* cited by examiner

IDENTIFYING TAMPER-RESISTANT CHARACTERISTICS FOR KERNEL DATA STRUCTURES

CROSS-REFERENCE TO RELATED APPLICATIONS

This application incorporates by reference for all purposes the full disclosure of U.S. patent application Ser. No. 14/469,390, filed concurrently herewith, entitled "IDENTIFYING KERNEL DATA STRUCTURES," U.S. patent application Ser. No. 14/469,151, filed concurrently herewith, entitled "SIGNATURE-BASED DETECTION OF KERNEL DATA STRUCTURE MODIFICATION," and U.S. patent application Ser. No. 14/468,943, filed concurrently herewith, entitled "SCANNING KERNEL DATA STRUCTURE CHARACTERISTICS."

BACKGROUND

Modern computer systems place a high importance on maintaining system security. In many computer systems, and especially those involving virtualized and/or distributed computer system environments where a plurality of machines may be hosted on shared physical host machines, security of the computer system and the applications and data on that computer system may be an important concern. An attack on the security of a computer system may seek to compromise that security and allow the attacker to acquire access to otherwise protected systems, applications and/or data. One typical method of attack is to attempt to seize control of the kernel of an operating system operating on a computer system and to thus seize control of the computer system. One typical method of seizing control of the kernel of an operating system is where an attacker may seek to alter and/or otherwise control data structures within the kernel. Kernel data structures are highly attractive to computer attackers due to their vast influence on the operation of a computer system. Tampering, modifying, or overwriting a kernel data structure with information controlled by an attacker can lead to a wide range of exploit behavior. As many kernel data structures are undocumented or vary in structure and location between operating systems and/or operating system versions, systematic identification and protection of kernel data structures may be difficult, leading to increased opportunities for exploitation of such kernel data structures and increase vulnerabilities of computer systems.

BRIEF DESCRIPTION OF THE DRAWINGS

Various embodiments in accordance with the present disclosure will be described with reference to the drawings, in which.

DETAILED DESCRIPTION

Figure 1:
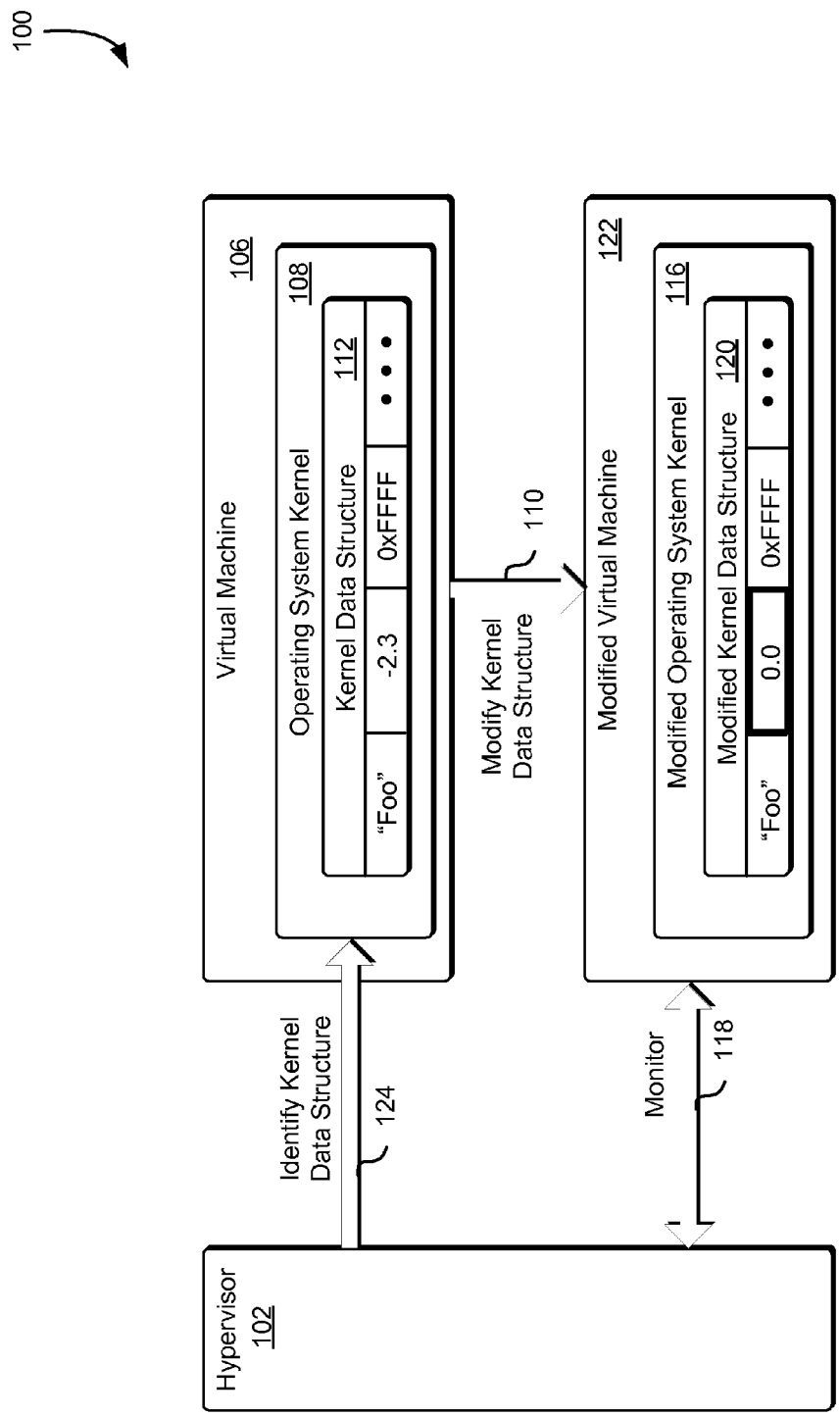
FIG. 1 illustrates an example environment where candidate modifications to a kernel data structure may be tested to determine the viability of a virtual machine in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods, systems and processes to enable a hypervisor to locate and identify tamper-resistant characteristics for kernel data structures using static and dynamic analysis techniques. Tamper-resistant characteristics for kernel data structures are characteristics values of those kernel data structures that cannot be changed without degrading the performance of the virtual machine. For example, an element of a kernel data structure that, when modified, causes the operating system to fail is one that cannot be easily changed. Identifying such tamper-resistant characteristics helps to identify and thwart malicious attacks on the computer system because an attacker, as part of an attack, may copy those kernel data structures out of kernel memory and into user-space memory, may modify the values there, and then may copy them back into kernel memory. An effective attacker is unlikely to modify values that are tamper-resistant because modifying such values and then copying them back into kernel memory is likely to render the operating system unusable. Hence, tamper-resistant values may be used as invariant identifiers to locate copies of kernel memory structures that have been improperly copied into user space, possibly pursuant to an attack. Data structures that have such tamper-resistant characteristics (including kernel data structures) may be referred to herein as tamper-resistant data structures or as tamper-resistant kernel data structures.

A hypervisor may first locate kernel data structures within an operating system kernel using a combination of static and dynamic analysis techniques. For example, a hypervisor, operating within the computer system, may analyze data structures in a VM image to produce a pointer reachability graph and may further analyze that pointer reachability graph to determine which of those data structures may include direct or indirect references to kernel data structures as described in U.S. patent application Ser. No. 14/469,390 entitled "IDENTIFYING KERNEL DATA STRUCTURES," which is incorporated by reference herein. The kernel data structures identified by the hypervisor may be dynamically allocated (e.g., they may be created at runtime, when the kernel is instantiated). The kernel data structures may also have associated metadata that may include an identifier for the virtual machine image and/or the kernel that produced the kernel data structures. For example, the associated metadata may indicate an operating system type, a kernel version, kernel patches, one or more application configurations and/or other metadata.

The hypervisor may then instantiate a first virtual machine based on the metadata and on the operating system kernel to monitor memory accesses within the operating system kernel and to detect high frequency memory accesses that correspond to or are closely related to one or more of the identified kernel data structures. For example, the hypervisor may monitor memory accesses over some sampling period and, for each memory location accessed, may accumulate a counter corresponding to that memory location. Those monitored memory locations that are more frequently accessed and that are also associated with kernel data structures are identified as candidates for further analysis.

Next, the hypervisor may create a plurality of virtual machine images that are configured based on the virtual machine operating system kernel. Each of the virtual machine images may also be related to one or more of the identified kernel data structures (also referred to herein as "candidate tamper-resistant kernel data structures" and "candidate tamper-resistant data structures") so that a virtual machine image corresponding to the state of one or more kernel data structures in an unaltered, unmodified, or untampered state may be created. From these virtual machine images, the hypervisor may generate a plan to systematically modify the contents of the kernel data structures (also referred to herein as a "fuzzing plan") for each of the virtual machine images. Each systematic modification of the contents of a kernel data structure (also referred to herein as a "fuzzing plan modification") may be based on a previous modification to the kernel data structure or may be based on a new modification of the kernel data structure. The fuzzing plan for a virtual machine image may select a variety of kernel data structure elements to modify and may also select a variety of modifications to apply to each of the kernel data structure elements (the kernel data structure elements that are modified by the fuzzing plan may also be referred to herein as "target memory locations"). The kernel data structure elements and/or the modifications applied to those elements may be selected based on a variety of selection criteria including, but not limited to, the frequently accessed memory locations, the type of data in the kernel data structure, the location with the kernel, the kernel elements which access the kernel data structure and other such criteria. For example, the hypervisor may use the kernel data structure layout map to identify one or more kernel data structures. The hypervisor may then choose target kernel data structures whose locations are the same or nearby to frequently accessed memory addresses. The hypervisor may then generate for each of the plurality of virtual machine images, a list of memory addresses to change affecting the one or more target kernel data structures and may also generate, for each of the memory addresses, a list of modifications to apply to the contents of that memory address.

The hypervisor may then instantiate a virtual machine corresponding to each modification in the list of modifications, for each of the memory addresses in the list of memory addresses and for each virtual machine image of the plurality of virtual machines. The hypervisor may also instantiate a virtual machine corresponding to each fuzzing plan modification. The fuzzing plan modifications for the instantiated virtual machines may be selected based on a measure of value (i.e., a utility value) of the fuzzing plan modifications. Fuzzing plan modifications that may yield more information about tamper-resistant characteristics of kernel data structures may be preferred to (may have a higher measure of value) those fuzzing plan modifications that may yield less information about tamper-resistant characteristics of kernel data structures (may have a lower measure of value).

In an embodiment, the measure of value is measured by a penalty function which may combine, for example, an efficacy value for the fuzzing plan modification with a diversity value for the fuzzing plan modification. As described herein, the efficacy value may be calculated by multiplying the volume of the region that contains the fuzzing plan modification (within a data space) by the probability that the region contains a tamper-resistant kernel data structure. Larger regions and/or regions with a higher probability of that the region contains a tamper-resistant kernel data structure would have a higher efficacy value for the modifications within those regions. The likelihood may be estimated, or may be determined by experimentation or may be determined by other such methods. The diversity value may be calculated by multiplying the volume of the region by an exploration factor. The exploration factor may be random or may be based at least in part on the number of modifications within the region or on the total number of modifications in all regions.

The virtual machines that are instantiated may be instantiated sequentially and/or in parallel as available computer system resources permit. Each of the instantiated virtual machines may be monitored by the hypervisor to determine if the virtual machine is not viable (also referred to herein as "unviable"). An unviable virtual machine may be one that exhibits one or more execution errors (e.g., the virtual machine fails, the virtual machine exhibits errors, the virtual machine generates unpredicted values or the virtual machine otherwise exhibits degraded performance due to the modifications to the kernel data structure) during a sampling period. A viable virtual machine may be one that, during the sampling period, does not exhibit such execution errors. Each of the instantiated virtual machines may run for a determined amount of time, or may run until a certain state is reached, or may run until an event is received, or may run until some other condition occurs. The hypervisor may exercise the virtual machine (e.g., run one or more applications to cause the virtual machine to pass through a variety of execution states) in order to determine if the virtual machine may fail during the monitoring period.

The hypervisor may then select one or more of the unviable virtual machines and generate an updated fuzzing plan based on those virtual machine images, based on the modifications that may have caused them to fail and/or based on the nature of the failure. For example, an instantiated virtual machine based on incrementing a counter value within a kernel structure may be used as the basis for attempting further modifications to that counter value (e.g., decrementing it, incrementing or decrementing by larger values, setting to zero, etc.). The hypervisor may then instantiate virtual machines based on the new fuzzing plan and may monitor those virtual machines for failure. Iterating on this process, the hypervisor may identify one or more tamper-resistant characteristics for the kernel data structures based on the plurality of different modifications to a kernel data structure element that may cause the resulting operating system kernel to be unviable.

FIG. 1 illustrates an example environment 100 where a kernel data structure of a virtual machine may be modified and the modified virtual machine may be monitored to determine if the kernel data structure may be tamper-resistant in accordance with at least one embodiment. A hypervisor 102 may first identify a candidate kernel data structure 124 and then may modify 110 one or more elements of a kernel data structure 112 of an operating system kernel 108 within a virtual machine 106. As used herein, and unless otherwise made clear from context, operations which describe a hypervisor as performing an action may be understood to indicate that a computer system associated with the hypervisor may execute instructions to perform the action in accordance with and/or under the control of the hypervisor code. The hypervisor 102 may identify a kernel data structure 124 as described herein and then may modify 110 the kernel data structure by directly modifying memory associated with the kernel data structure after the virtual machine has been instantiated. The hypervisor may pause and/or suspend the instantiated virtual machine before modifying the kernel data structure. The hypervisor may also modify a virtual machine image containing the kernel data structure and instantiate a virtual machine based on the modified virtual machine image. The hypervisor 102 may then monitor 118 the modified virtual machine 122 with the modified operating system kernel 116 based on the modified kernel data structure 120 to determine whether the modification to the kernel data structure may cause the virtual machine to become unviable. For example, the hypervisor 102 may monitor the modified virtual machine 122 for a time period to see if the modified virtual machine 122 fails, exhibits degraded performance, loses access to one or more system resources, begins responding to applications in an unpredictable manner and/or other such unviable behavior. The hypervisor may monitor the modified virtual machine using a system such as a monitoring system (described herein) that may be configured to examine the state of the modified virtual machine and to determine if any execution failures that may have occurred.

Kernel data structures are collections of data elements associated with an operating system kernel, which allow the operating system to track one or more states of the computer system. For example, when a new user logs onto a computer system, a kernel data structure may be created and/or modified to reflect data about that user including login times, permissions, resources and/or other such data. Similarly, when a new process is instantiated on a computer system, a kernel data structure relating to that new process may be created and/or modified to represent that process. Kernel data structures may be used by other processes within the kernel to control resources associated with the computer system. In the example of the kernel data structure associated with the new process, the operating system may use data in the kernel data structure to manage scheduling of the process, the priority of the process, whether to suspend the process, how and when to associate resources with the process and/or other such operating system related operations. Data structures (including kernel data structures) may contain data items such as numbers, strings, arrays, counters, dates, times and/or other such data items, pointers to other data structures, pointers to executable code and/or other such data items.

Kernel data structures may be considered attractive targets for attackers and/or malicious users, processes, applications, services, modules and/or other such computer system entities. Such attackers may make modifications to kernel data structures to obtain permissions and/or privileges related to the computer system. For example, a kernel data structure may contain a legitimate reference to executable code related to the operating system. Such a kernel data structure may be used by a process scheduler to facilitate the execution of that code on a regular basis with privileged access. If an attacker were to substitute a reference to different executable code within that kernel data structure, then the different executable code might be run on a regular basis and with privileged access instead. Because scheduling of applications within the operating system may occur at a low level, it may be difficult for an application to detect such malicious activity.

Kernel data structures may be difficult to identify for a number of reasons. There is typically a wide variety of operating system types within a single computing environment, from a number of different vendors. Additionally, each of the different operating system types may undergo a large number of changes as they are developed and patched, often resulting in dozens or even hundreds of different versions for a single operating system. Operating system vendors also typically do not catalog these kernel data structures or provide lists of such kernel data structures as they are intended for internal consumption within the operating system. Finally, because of their nature, kernel data structures are often optimized for speed rather than usability. So a kernel data structure may contain what may appear to be an array of numbers but that array of numbers may be recast as an array of pointers and those pointers may be used to access other areas within memory.

Kernel data structures may be tamper-resistant kernel data structures if, when modifications are made to the kernel data structure, those modifications may cause the kernel and/or the operating system to fail. A kernel data structure may be considered tamper-resistant if, for example, modifications to that kernel data structure may render a virtual machine unviable when that virtual machine is based on a kernel that uses a modified version of the kernel data structure. A kernel data structure may be considered not tamper resistant if a variety of values may be introduced into the kernel data structure without causing the virtual machine to become unviable. Such kernel data structures, when modified, may cause unpredictable and/or non-productive results; however, the operating system kernel may be configured to recover from such unpredictable and/or non-productive results, thus keeping the virtual machine viable. Kernel data structures which are sensitive to changes (i.e., have tamper-resistant characteristics) may be used as markers for copies of kernel memory that may have been made by an attacker, pursuant to an attack, because such kernel data structures may remain invariant when copied from kernel memory. For example, if a kernel data structure must always retain a certain thirty-two byte sequence due to the kernel data structure being tamper resistant, it may be difficult for an attacker to hide malicious copying of kernel memory because the hypervisor may search user memory for that thirty-two byte sequence and, if that sequence is found, it may provide a strong indicator to the hypervisor that an attacker may be copying kernel data structures into user memory pursuant to a malicious attack. In some embodiments, a hypervisor may be configured to alert one or more processes associated with a virtual computer system of the possibility of a pending attack and/or an attack-in-progress as a result of finding data corresponding to a tamper-resistant kernel data structure in user memory.

Figure 2:
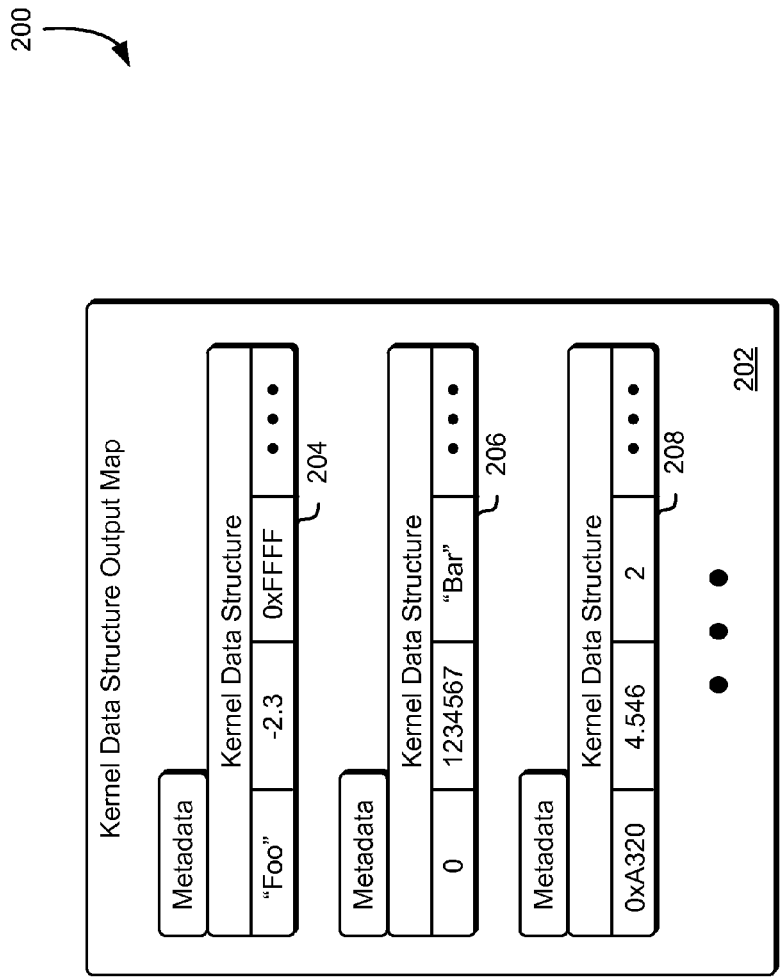
FIG. 2 illustrates an example environment where a kernel data structure output map may be generated in accordance with an embodiment.

FIG. 2 illustrates an example environment 200 where a kernel data structure output map associated with an operating system kernel may be generated, such as described in connection with FIG. 1 and in accordance with at least one embodiment. The kernel data structure output map 202 may be generated by the hypervisor based at least in part on a pointer reachability graph as described in U.S. patent application Ser. No. 14/469,390 entitled "IDENTIFYING KER- NEL DATA STRUCTURES," which is incorporated by reference herein, and based at least in part on an operating system kernel. Each entry of the one or more entries in the kernel data structure output map 202 may include one or more data fields associated with a kernel data structure and may also include one or more data characteristics associated with that kernel data structure including, but not limited to, data types of the data fields, data sizes of the data fields, identifiers associated with the data fields, memory locations of the data fields, frequency of access of the data fields and other such data characteristics. The data characteristics may be derived from the data and/or metadata in the pointer reachability graph as well as from other virtual machine metadata. The kernel data structure output map 202 may also include one or more confidence scores associated with the kernel data structures, as described in U.S. patent application Ser. No. 14/469,390 entitled "IDENTIFYING KERNEL DATA STRUCTURES," which is incorporated by reference herein.

Kernel data structures may include a variety of data types and data values. In the example illustrated in FIG. 2, a first kernel data structure 204 includes a string value, a floating point value, a pointer value, one or more other values and data characteristics and/or metadata associated with the first kernel data structure 204. A second kernel data structure 206 includes a counter value, an integer value, a string value, one or more other values and data characteristics and/or metadata associated with the second kernel data structure 206. A third kernel data structure 208 includes a pointer value, a floating point value, a counter value, one or more other values and data characteristics and/or metadata associated with the third kernel data structure 208. As may be contemplated, the structure, type, and/or data contained in the kernel data structures described herein are illustrative examples and other structures, types and/or data contained in kernel data structures may be considered as within the scope of the present disclosure.

Figure 3:
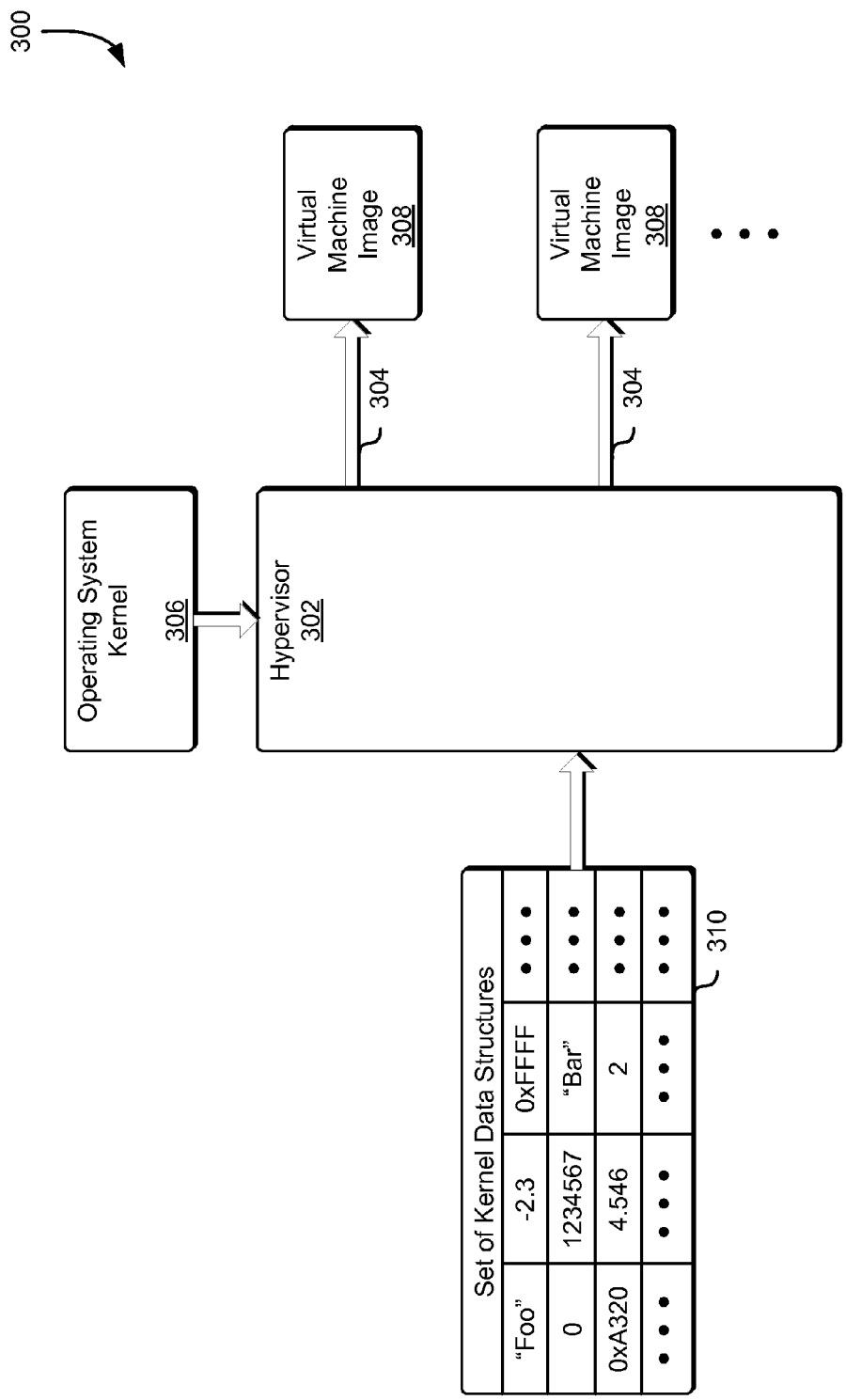
FIG. 3 illustrates an example environment where a virtual machine image may be created for testing purposes in accordance with an embodiment.

FIG. 3 illustrates an example environment 300 where a virtual machine image may be created based at least in part on a kernel data structure and based at least in part on an operating system kernel as described in connection with FIG. 1 and in accordance with at least one embodiment. A hypervisor 302 may instantiate 304 one or more virtual machine images 308 based at least in part on an operating system kernel 306. A virtual machine image is a specification for a virtual machine and may be based on a virtual machine description, virtual machine metadata, a virtual machine configuration, a list of one or more applications and/or other such data. A virtual machine image may be based on an instantiated virtual machine and may be, for example, a snapshot of that instantiated virtual machine. A virtual machine image 308 may also be based, at least in part, on a kernel data structure of a set of kernel data structures 310 when, for example, the kernel data structure is dynamically created and/or dynamically modified during virtual machine execution. For example, if a kernel data structure, at instantiation, contains a value of two for a certain field at instantiation, but an instance of that kernel data structure at execution was found to contain an modified value (i.e., due to normal virtual machine operation), the virtual machine image may be created with the modified value from the kernel data structure. A virtual machine image may be based on a plurality of kernel data structures when, for example, those kernel data structures do not overlap (i.e., do not reference the same memory locations). A virtual machine image may also be based on a plurality of kernel data structures that do overlap when it is desirable to quickly cover a search space associated with a fuzzing plan, as described herein.

Figure 4:
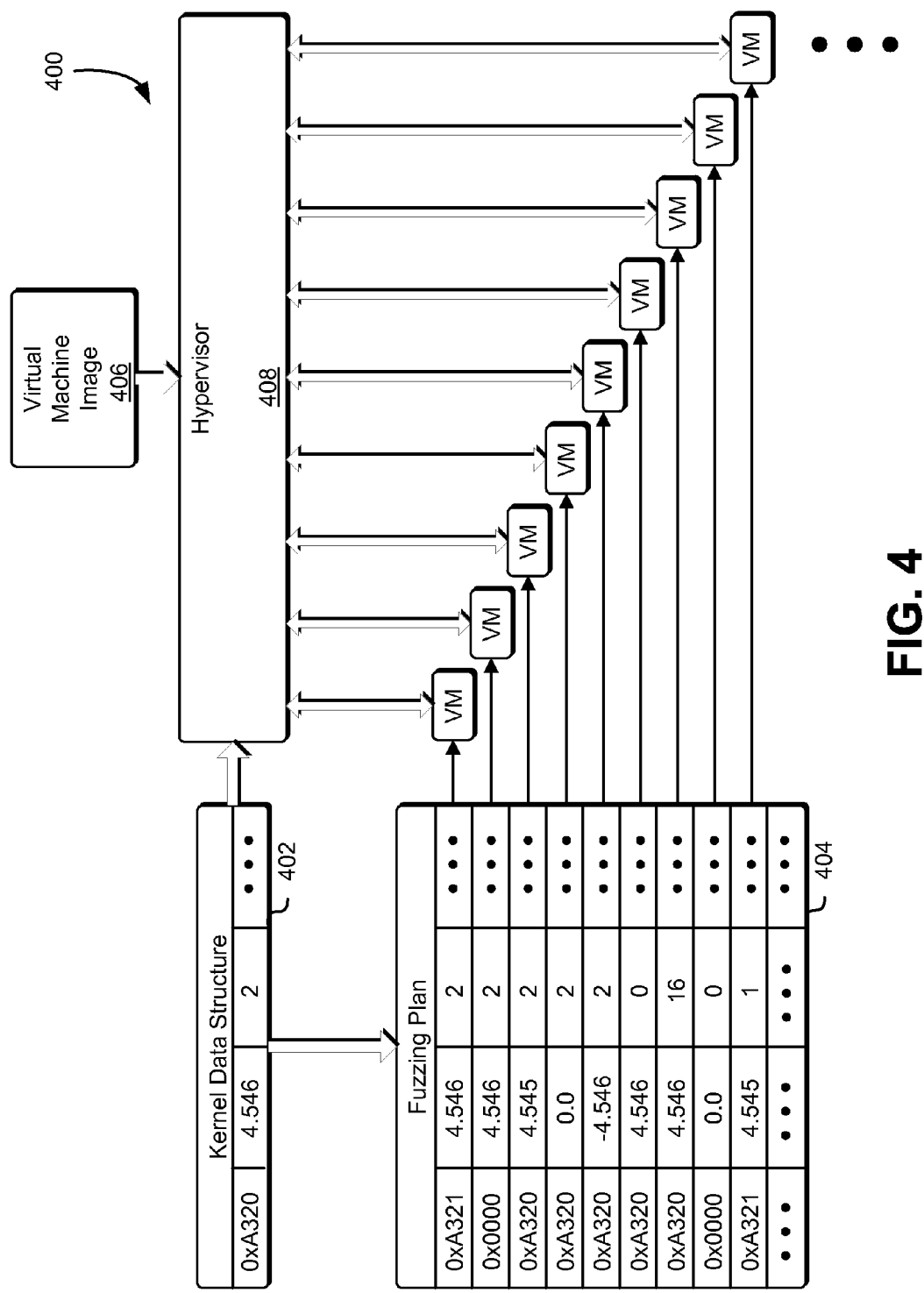
FIG. 4 illustrates an example environment where a fuzzing plan based on a virtual machine image may be implemented in accordance with an embodiment.

FIG. 4 illustrates an example environment 400 where a fuzzing plan based on a virtual machine image may be implemented as described in connection with FIG. 3 and in accordance with at least one embodiment. A virtual machine image 406 which may be based on a kernel data structure 402 as described in connection with FIG. 3 and in accordance with at least one embodiment may be used by a hypervisor 408 to generate a fuzzing plan 404. A fuzzing plan, which is a plan for systematically modifying the values contained in a kernel data structure, will create a list of modifications to one or more of the values in a kernel data structure. For example, as illustrated in FIG. 4, the kernel data structure 402 shows three data values, a pointer ("0xA320"), a floating point value ("4.546") and a counter value ("2"). The fuzzing plan 404 shows systematic modifications to these three values. The first two lines in the fuzzing plan are modifications to the pointer value, the next three lines are modifications to the floating point value, the next two lines are modifications to the counter value and the last two lines modify all three values. The modifications illustrated herein show both minor modifications (e.g., changing a value be a small amount) and major modifications (e.g., setting a value to zero or negating a value). The hypervisor 408 may then instantiate a plurality of virtual machines based on the virtual machine image 406, but with modifications based on the fuzzing plan. In the example illustrated in FIG. 4, the fuzzing plan has a list of nine modifications which correspond to the nine instantiated virtual machines The hypervisor may monitor the instantiated virtual machine using a monitoring system such as the monitoring system 510 described herein in connection with FIG. 5.

Figure 5:
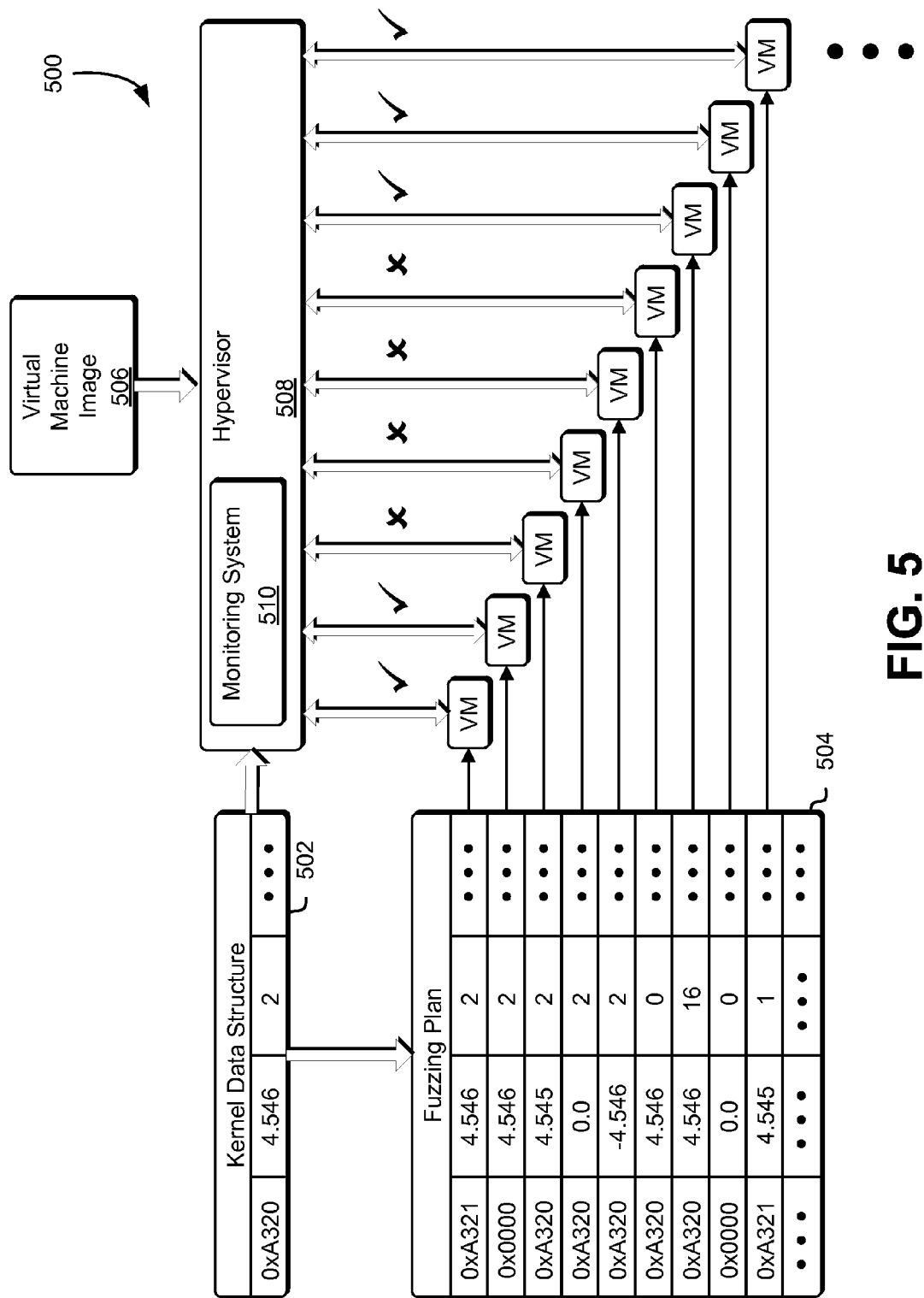
FIG. 5 illustrates an example environment where a hypervisor may monitor a plurality of virtual machines based on a fuzzing plan in accordance with an embodiment.

FIG. 5 illustrates an example environment 500 where a hypervisor may monitor a plurality of virtual machines based on a fuzzing plan as described in connection with FIG. 4 and in accordance with at least one embodiment. Virtual machines instantiated by a hypervisor 508 that may be based at least in part on a virtual machine image 506 and may be based at least in part on a fuzzing plan 504 that is based on a kernel data structure 502 may be monitored by the hypervisor for failures. The hypervisor may allow the virtual machines to run for a length of time, or may allow the virtual machines to run until a state is reached, or may allow the virtual machines to run until an event occurs or may allow the virtual machine to run until some other such condition occurs. In the example illustrated in FIG. 5, the virtual machines that are unviable are denoted by check marks and the virtual machines that remain viable are denoted by "X"s.

The hypervisor may monitor the virtual machines using a monitoring system 510 (also referred to herein as a "workload monitoring system") to detect unviable machines such as may occur with a crash caused by execution errors including, but not limited to, memory access violations, illegal instruction executions, buffer overflows, illegal resource allocations or other causes. The hypervisor may also monitor the virtual machine to detect unviable machines as indicated by unstable operation, unpredictable results, application failures, loss of access to system resources, improper access to system resources or combinations of these and/or other such conditions. While monitoring the virtual machines, the hypervisor may also instantiate and/or monitor a workload (e.g., a collection of one or more applications configured to perform a specified task) comprising one or more applications on the virtual machine that may be configured to exercise one or more capabilities of the virtual machine and/or to induce one or more execution errors such as those described herein. A workload experiment may be performed by the hypervisor which may comprise instantiating and/or monitoring one or more applications of a workload and recording experiment data associated with the workload experiment. A workload experiment may include executing multiple execution cycles of the applications, may consist of running the applications for a specified length of time, may consist of altering which applications in the workload are run, may consist of altering the applications themselves or may consist of combinations of these and/or other such workload execution methods. If applications associated with a workload experiment crash and/or exhibit unstable behavior, the hypervisor may determine that the associated virtual machine may be unviable. The hypervisor may determine if a virtual machine is unviable based at least in part on the performance of any process that the hypervisor can inspect, even in the case where the remainder of the virtual machine continues to operate correctly. The hypervisor may monitor one or more external processes that may be configured to monitor the execution of virtual machines and may use determinations from these external processes to determine whether a virtual machine is unviable.

Because the number of tests, and thus the number of virtual machines may grow large, the hypervisor may combine multiple fuzzing tests into a single virtual machine instance. To aid in the analysis described herein, the hypervisor may combine tests that do not refer to overlapping sections of memory and/or even to tests that do not refer to physically and/or logical proximal sections of memory. For example, multiple fuzzing tests that refer to different kernel data structures in different sections of memory may be combined into a single virtual machine instance. In such an example, if the virtual machine becomes unviable due to the multiple tests, further refinements may be required to determine which of the multiple tests may have caused the failure. For example, a virtual machine that implements kernel modifications for four distinct fuzzing tests may fail. If such a virtual machine fails, the hypervisor may execute further refinement of the tests to see which of the kernel modifications may have led to the failure including, for example, isolating the tests, performing sub-combinations of the tests and other techniques.

Figure 6:
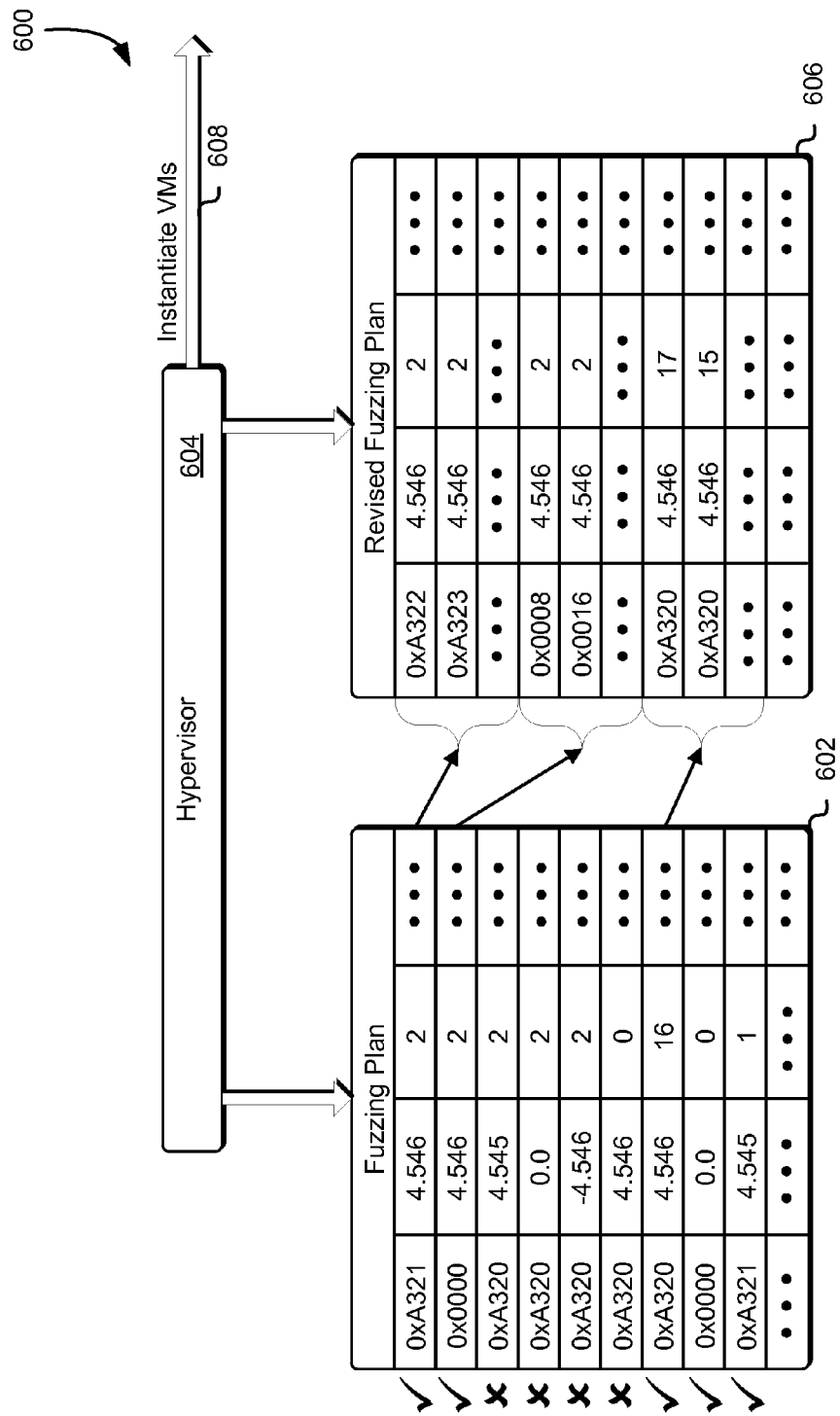
FIG. 6 illustrates an example environment where a fuzzing plan may be refined in accordance with an embodiment.

FIG. 6 illustrates an example environment 600 where a fuzzing plan may be refined as described in connection with FIG. 5 and in accordance with at least one embodiment. The hypervisor 604 may identify those virtual machines that are unviable and based on the fuzzing plan elements that those unviable virtual machines were based on (denoted herein with check marks), may create a revised (or refined) fuzzing plan 606 by, for example, further modifying the modified values (also referred to herein as "modifications") that may have caused the unviability. The hypervisor may then continue instantiating virtual machines 608, monitoring those virtual machines and revising the fuzzing plan to determine tamper-resistant characteristics for one or more kernel data structures.

The hypervisor may create the initial fuzzing plan as described in connection with FIG. 4 with a large amount of variation in the modified kernel data structure elements. This may allow the hypervisor to produce a fuzzing plan 602 with broad coverage over the entire search space of the kernel data structure elements. As used herein a "search space" is a multidimensional range of values for a combination of variable values. For example, a variable "X" might have allowable values ranging from one to ten (inclusive) and a variable "Y" might have allowable values ranging from negative two to positive two (inclusive). A two-dimensional search space for the combination of these values would include all possible values within the defined range. A search with broad coverage of such a search space would choose values widely spread within the search space. So, for example, choosing (X,Y) values from {(1,–2), (5,–2), (10,–2), (1,0), (5,0), (10,0), (1,2), (5,2), (10,2)} would produce a broad (and also an evenly-distributed) coverage of the search space. Such an approach may also be referred to herein as "coarse sampling." The hypervisor may create the revised fuzzing plan 606 to produce a more specific coverage of the search space. For example, if the initial search space as described above found a point of interest (e.g., an unviable virtual machine) at the point (5,0), the revised fuzzing plan might include modified kernel data structures with values around that point (e.g., chosen from {(4,–1), (5,–1), (6,–1), (4,0), (6,0), (4,1), (5,1), (6,1)}). Such a refined search may also be referred to herein as "fine sampling."

Techniques to perform multidimensional sampling may proceed similarly, by selecting one or more points within the multi-dimensional space and determining whether those one or more points satisfy the search criteria. Refinement of the search may also be performed based on the one or more points within the multi-dimensional space. For example, a search refinement may subdivide the search space into multi-dimensional "boxes" and may concentrate search refinements on the most productive boxes. The most productive box may be the box where the product of the area of a box, times the likelihood that there may be one or more areas of interest within the box, has the highest value. In a two-dimensional example such as the one described herein, the search space may be subdivided into four equally sized boxes and, in that example, the box with the highest likelihood of there being one or more areas of interest may be refined upon first (such as, for example, by being further subdivided). Such sampling, when performed on multi-dimensional spaces, may cause the size of the refined areas of interest to rapidly converge. For example, in a one-hundred dimensional search space (i.e., a fuzzing plan with one-hundred kernel data structure values), the boxes may decrease by factor of the length of a side of the box to the one-hundredth power at each iteration. The hypervisor 604 may use one or more data processing techniques to effectively sample the search space such as, for example, generating a hash value of previously chosen values to avoid duplicating kernel data structures in the fuzzing plan, particularly when refining the fuzzing plan. As an example of how duplicating kernel data structures might occur without such prevention, consider the last data row of the fuzzing plan 602, which illustrates a kernel data structure that includes the values "0xA321", "4.545" and "1". A possible refined fuzzing plan for that kernel data structure might include the values "0xA322", "4.546" and "2" (modifying each value by one). However, that kernel data structure is already in the revised fuzzing plan 606, in the first row. By generating a hash value of the values in that kernel data structure, duplicated testing of kernel data structures may be avoided.

The hypervisor may use the results of the process of instantiating virtual machines based on a fuzzing plan, monitoring those virtual machines to detect unviable virtual machines and revising the fuzzing plan based on those unviable virtual machines to produce one or more expressions characterizing the tamper-resistance of one or more kernel data structures. An expression (i.e., a Boolean expression) may be formed based on the results of an iteration of the fuzzing plan. As an example, the results of testing using a fuzzing plan may determine that if attribute one is set to one, an unviable virtual machine may result, if attribute one is set to two, an unviable virtual machine may result or if attribute one is set to three, an unviable virtual machine may result. A simple expression for such a result may be "if attribute one equals one or attribute one equals two or attribute one equals three then a tamper resistant kernel data structure may be identified." This expression may represent a Boolean expression which, if true, may indicate one or more tamper resistant characteristics of a kernel data structure.

A more refined (or simplified) expression may be "if attribute one equals one, two or three" or "if attribute one is less than four and greater than zero" or some other such expression. In some embodiments, the expression and/or the refined expression can be used to determine additional fuzzing tests which may be run. For example, if an expression and/or a refined expression predicts one or more fuzzing tests that have not been tried, the hypervisor may then try those fuzzing tests and, based on the result of those fuzzing tests, may determine either that the expression and/or the refined expression may be partially incorrect or that one or more fuzzing tests may have been previously missed. In the above example, if further fuzzing tests indicate that attribute one equaling five also causes an unviable virtual machine, it may be logical to assume the missing value of attribute one equaling four may also cause an unviable virtual machine. The fuzzing plan may be refined to include this test, to verify whether the predicted formula (in this case, attribute one being less than six) is true or not.

The expression may be simplified based on a penalty function which may determine, for example, that a more complex and/or less accurate expression is less desirable. For example, an expression that includes every result as a single Boolean clause ("a=1 OR a=2 OR a=3) may be highly accurate but may also be highly complex while a refined expression which generalizes ("a<4") may be simpler, but less accurate. The accuracy of an expression may be based on one or more correlation measurements between values predicted by the expression and known characteristics. In this example, a value for "a" of "3.5" may not result in an error and so the refined expression is not accurate for this value. Correlation measurements may be based on the number of false positives and/or false negatives as compared to the number of correct results. Some inaccuracy may be permitted by penalty function if, for example, "a=3.5" is the only value with a false negative. A penalty function may be used to balance the complexity, the accuracy and/or other such factors in a weighted manner to produce the most effective refined expression.

Figure 7:
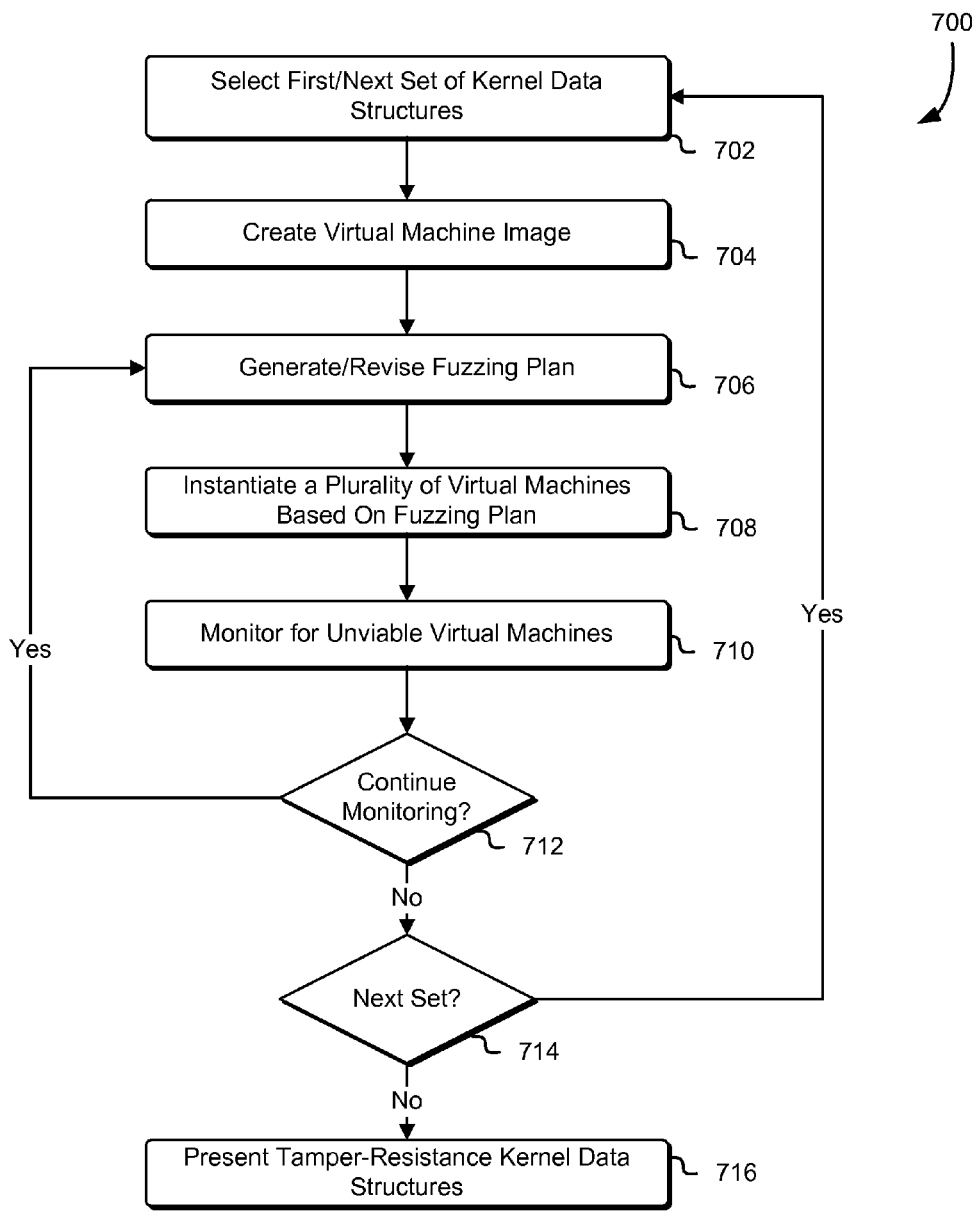
FIG. 7 illustrates an example process for creating and refining a fuzzing plan in accordance with an embodiment.

FIG. 7 illustrates an example process 700 for creating and refining a fuzzing plan as described in connection with FIGS. 3-6 and in accordance with at least one embodiment. A hypervisor such as the hypervisor 102 described herein at least in connection with FIG. 1 may perform at least a part of the process illustrated in FIG. 7. A hypervisor may first select a set of kernel data structures 702 and may create a virtual machine image 704 based at least in part on the set of kernel data structures and also based at least in part on an operating system kernel associated with those kernel data structures. The hypervisor may then generate a fuzzing plan 706 as described herein and may instantiate a plurality of virtual machines 708 based at least in part on the fuzzing plan and also based at least in part on the virtual machine image. The hypervisor may then monitor 710 the plurality of virtual machines to detect any that may be unviable as a result of the modifications to the kernel data structure that were made according to the fuzzing plan. Based on the unviable virtual machines, the hypervisor may then revise the fuzzing plan 706 and may start one or more new virtual and/or stop one or more existing virtual machines based on the refined fuzzing plan. The hypervisor may then determine whether to continue monitoring 712 and whether to select a next set of kernel data structures 714. If the hypervisor determines not to select the next set of kernel data structures 714, the hypervisor may stop monitoring and may present information associated with one or more characteristics of the tamper-resistant kernel data structures 716.

Figure 8:
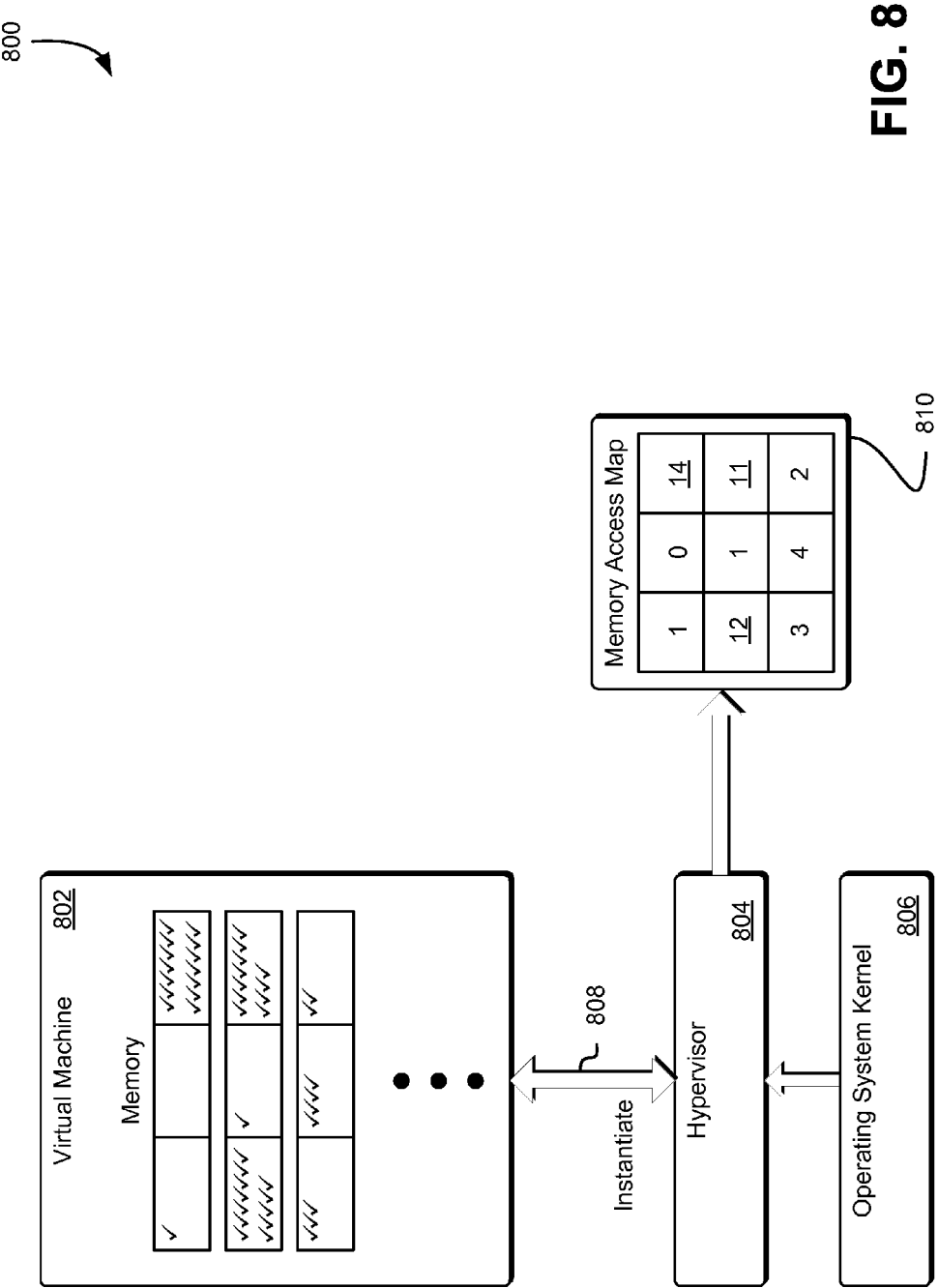
FIG. 8 illustrates an example environment where frequently accessed memory locations within a virtual machine may be determined in accordance with an embodiment.

FIG. 8 illustrates an example environment 800 where frequently accessed memory locations within a virtual machine may be determined as described in connection with FIG. 1 and in accordance with at least one embodiment. A hypervisor 804 may instantiate 808 a virtual machine 802 based on an operating system kernel 806. The hypervisor may then monitor the virtual machine 802 for memory accesses. The hypervisor may use the memory accesses to produce a memory access map 810 of frequency of memory location access. The hypervisor may also select one or more frequently accessed memory locations (denoted by the underlined values) within the memory access map 810 and may base further analysis at least in part on these selected frequently accessed memory locations.

Figure 9:
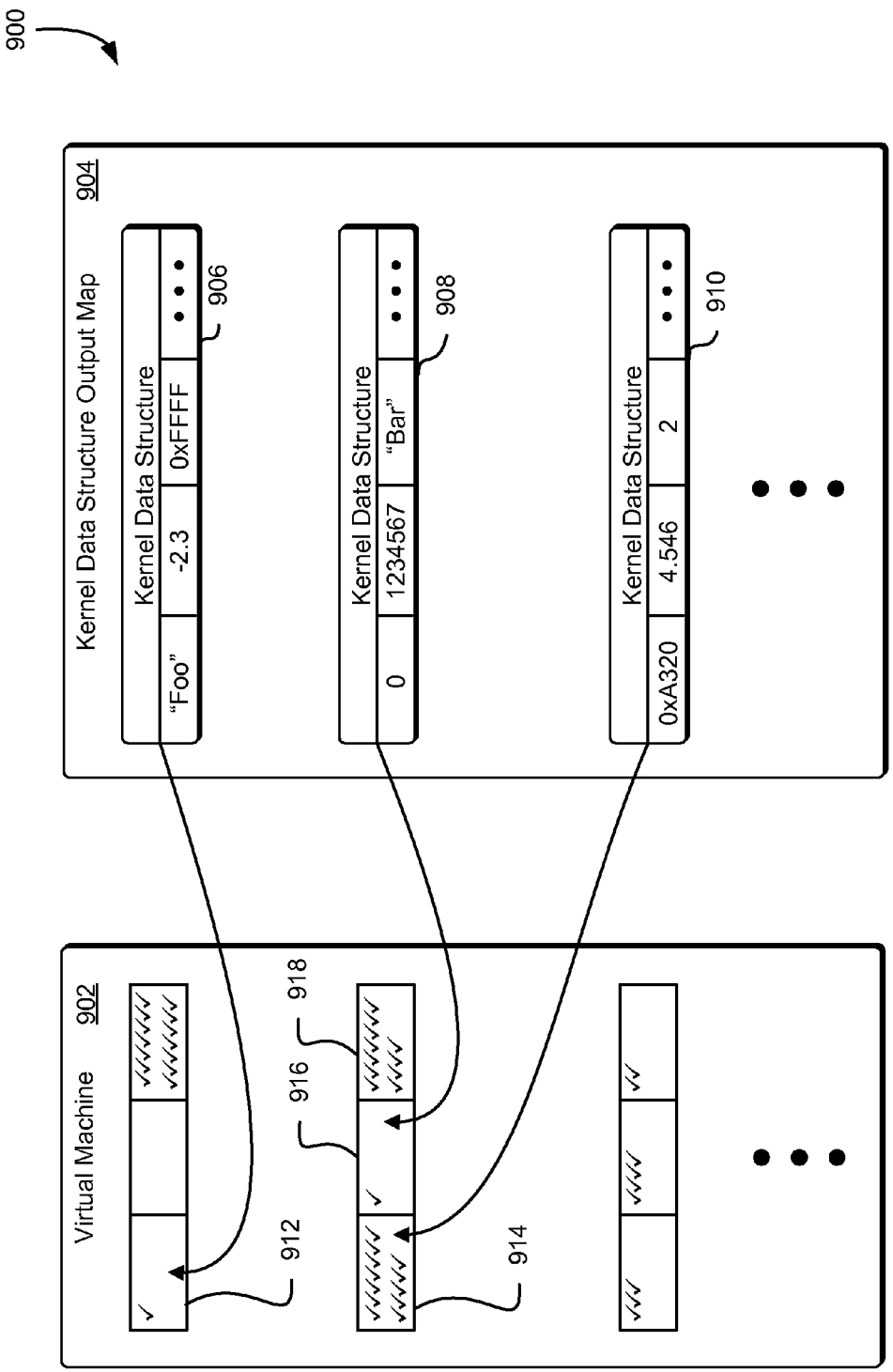
FIG. 9 illustrates an example environment where modifications to kernel data structures may be based on memory access frequency in accordance with an embodiment.

FIG. 9 illustrates an example environment 900 where modifications to kernel data structures for a fuzzing plan may be based at least in part on the frequency of access of memory locations associated with those kernel data structures, as described in connection with FIG. 1 and in accordance with at least one embodiment. A hypervisor may determine the location within a virtual machine 902 of one or more kernel data structures specified by a kernel data structure output map 904 and may base a fuzzing plan at least in part on the frequency of access of the memory associated with that kernel data structure. For example, a kernel data structure 906 that may be associated with infrequently accessed memory 912 may not be selected for a fuzzing plan, or may have different values chosen for the initial fuzzing plan, or may have different values chosen for revisions to the fuzzing plan, or may be analyzed according to a combination of these and/or other such modifications to the analysis techniques. A kernel data structure 910 that may be associated with frequently accessed memory 914 may be analyzed according to different analysis techniques. A kernel data structure 908 that is associated with infrequently accessed memory 916, but which is in close physical or logical proximity to frequently accessed memory 918, may also be analyzed according to different analysis techniques. A kernel data structure that is associated with infrequently accessed memory 916 and which is followed by frequently accessed memory 918 may illustrate tamper-resistant characteristics due to buffer overflows from the infrequently accessed memory 916 to the frequently accessed memory 918.

For example, a kernel data structure that is frequently accessed may also be frequently changing (e.g., if the accesses are mostly write accesses). A kernel data structure that is frequently accessed may also be infrequently changing (e.g., if the accesses are mostly read accesses). A kernel data structure that is infrequently accessed may be infrequently changing as well. A kernel data structure that is infrequently accessed and/or infrequently changing may take a longer time to exhibit tamper-resistant characteristics due to that infrequent access. For example, such an infrequently accessed kernel data structure may not be accessed during the sampling period and thus, may or may not be a tamper-resistant kernel data structure. Concentrating analysis on memory locations with a higher frequency of access and/or a higher frequency of change may make the processes described herein more efficient. For example, a modified kernel data structure that is accessed once a second is more likely to cause a kernel failure than a modified kernel data structure that is accessed once an hour.

In some embodiments, different memory locations within a kernel data structure can be accessed at different frequencies. For example, some memory locations can be accessed many more times during a sample period. In some embodiments, the frequency of access of a kernel data structure may be based on the maximum access, or on the average access or on some other basis. This frequency of access for a particular kernel data structure may provide an additional basis for selecting modifications for that particular kernel data structure in the fuzzing plan. A kernel data structure that is frequently accessed and with most of the data elements also frequently accessed may be a good candidate for inclusion in the fuzzing plan. A kernel data structure that is occasionally accessed, but with some of the data elements frequently accessed, may also be a good candidate for inclusion in the fuzzing plan, particularly with respect to the frequently accessed data elements. A kernel data structure that is infrequently accessed, and/or the data elements that are infrequently accessed, may be a less desirable candidate for inclusion in the fuzzing plan.

Figure 10:
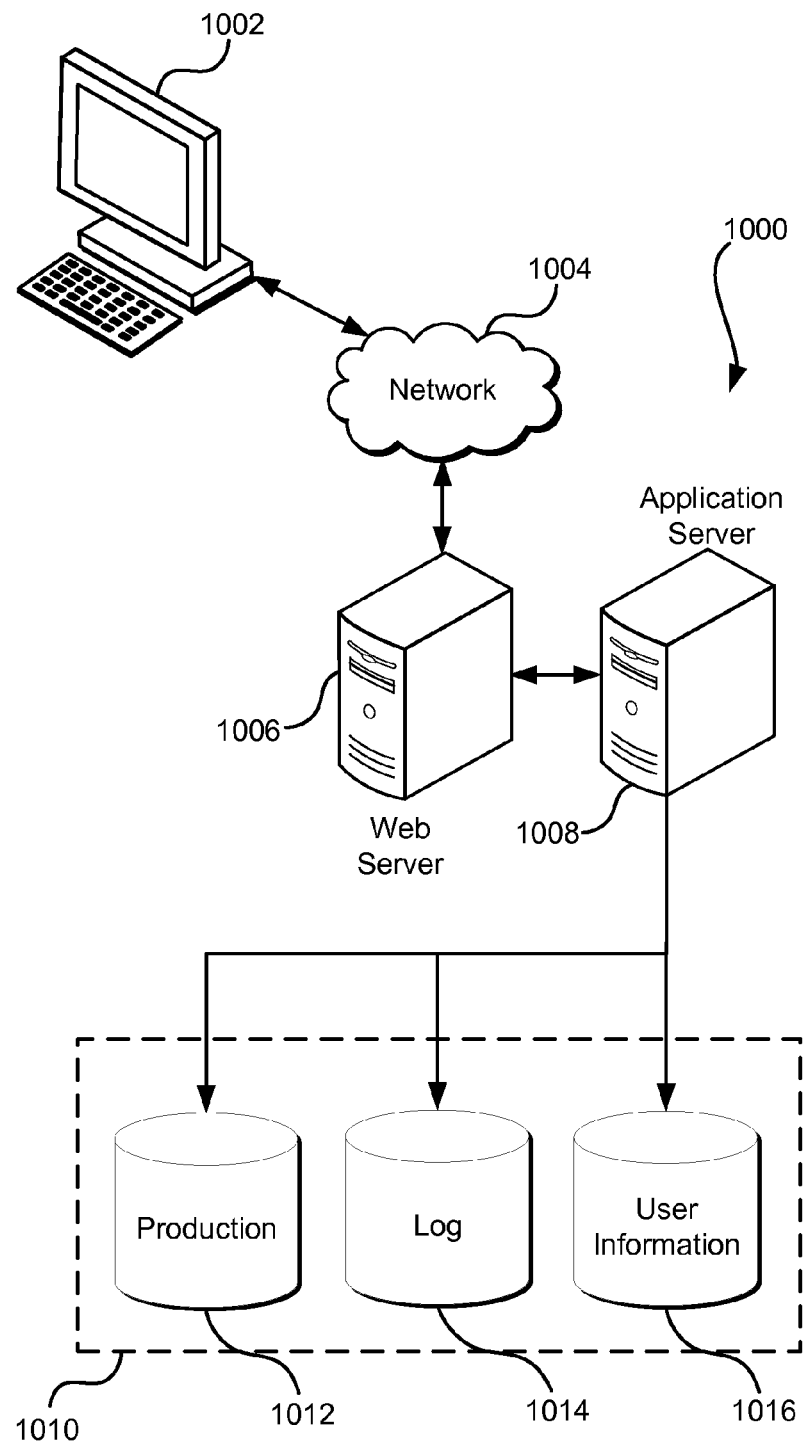
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1002 and the application server 1008, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for identifying a tamper-resistant kernel data structure, comprising:
under the control of one or more computer systems configured with executable instructions,
determining a set of kernel data structures within a virtual machine image, each kernel data structure of the set of kernel data structures at least specifying one or more memory locations of a set of memory locations within the virtual machine image;

creating a set of modifications, each modification in the set of modifications modifying one or more memory locations of the set of memory locations, each modification of the set of modifications based at least in part on one or more kernel data structures of the set of kernel data structures;

refining the set of modifications by iteratively:
instantiating a plurality of virtual machines, each virtual machine of the plurality of virtual machines based at least in part on a modified virtual machine image, the modified virtual machine image generated by applying one or more modifications in the set of modifications to the virtual machine image;

performing one or more workload experiments on the plurality of virtual machines to induce one or more execution errors in the plurality of virtual machines;

monitoring the one or more workload experiments to detect one or more unviable virtual machines based at least in part on detecting the one or more execution errors;

recording experimental data obtained by performing the one or more workload experiments; and generating one or more new modifications in the set of modifications, each new modification based at least in part on one or more modifications in the set of modifications, each new modification further based at least in part on the experimental data; and providing information based at least in part on the experimental data, the information indicating one or more tamper-resistant kernel data structures.

2. The computer-implemented method of claim 1, wherein determining the set of memory locations is further based at least in part on:

instantiating a first virtual machine, the first virtual machine based at least in part on the virtual machine image;

monitoring the first virtual machine to determine one or more memory accesses of target memory locations within the first virtual machine, the target memory locations based at least in part on at least a subset of the kernel data structures; and adding one or more memory locations to the set of memory locations based at least in part on the one or more memory accesses.

3. The computer-implemented method of claim 1, wherein monitoring the one or more workload experiments comprises instantiating a workload monitoring system to detect the one or more execution errors, the one or more execution errors including one or more of: a memory access violation, an illegal instruction execution, a buffer overflow, or an illegal resource allocation.

4. The computer-implemented method of claim 1, wherein refining the set of modifications further comprises:

determining one or more characteristics shared between the one or more kernel data structures of the set of kernel data structures; and removing one or more modifications from the set of modifications based at least in part on the one or more characteristics and further based at least in part on the experimental data.

5. A system, comprising:
at least one computing device that implements one or more services, wherein the one or more services:

instantiate a plurality of virtual machines, each virtual machine of the plurality of virtual machines based at least in part on a modified virtual machine image of a set of modified virtual machine images, each modified virtual machine image of the set of modified virtual machines images based at least in part on a virtual machine image, each modified virtual machine image of the set of virtual machine images including one or more modifications to a set of memory locations within the virtual machine image, the set of memory locations associated with one or more kernel data structures within the virtual machine image;

monitor the each virtual machine of the plurality of virtual machines to detect one or more execution errors, the one or more execution errors induced by performing one or more workload experiments on each virtual machine of the plurality of virtual machines; and provide information identifying one or more tamper-resistant kernel data structures of the one or more kernel data structures, the one or more tamper-resistant kernel data structures identified based at least in part on the one or more execution errors.

6. The system of claim 5, wherein the one or more services iteratively:

instantiate the plurality of virtual machines;

monitor each virtual machine of the plurality of virtual machines; and generate one or more new modified virtual machine images in the set of modified virtual machine images, each new modified virtual machine image based at least in part on a modified virtual machine image of the set of modified virtual machine images, each new modified virtual machine image further based at least in part on the one or more execution errors, each new modified virtual machine image including one or more modifications to a set of memory locations associated with one or more kernel data structures within the new modified virtual machine image.

7. The system of claim 5, wherein the one or more services:

identify one or more candidate tamper-resistant kernel data structures from the one or more kernel data structures, based at least in part on one or more data characteristics of the one or more kernel data structures; and determine the one or more modifications to the set of memory locations within the virtual machine image based at least in part on the one or more candidate tamper-resistant kernel data structures.

8. The system of claim 7, wherein the one or more services identify the one or more candidate tamper-resistant kernel data structures based at least in part on a confidence score associated with the one or more candidate tamper-resistant kernel data structures.

9. The system of claim 7, wherein the one or more candidate tamper-resistant kernel data structures are specified by a kernel data structure output map.

10. The system of claim 5, wherein the one or more workload experiments are based at least in part on executing one or more applications on the one or more virtual machines, the one or more applications including one or more instructions associated with the one or more modifications.

11. The system of claim 5, wherein the one or more modifications to the set of memory locations within the virtual machine image are based at least in part on a frequency of access of one or more memory locations of a first virtual machine, the frequency of access determined by monitoring the first virtual machine, the first virtual machine based on the virtual machine image.

12. The system of claim 5, wherein the one or more modifications to the set of memory locations includes a set of fuzzing plan modifications, each fuzzing plan modification of the set of fuzzing plan modifications based at least in part on modifying one or more of the one or more modifications, each fuzzing plan modification of the set of fuzzing plan modifications further based at least in part on the one or more data structures.

13. The system of claim 12, wherein each fuzzing plan modification of the set of fuzzing plan modifications is further based at least in part on a measure of value of the fuzzing plan modification.

14. The system of claim 13, wherein the measure of value of the fuzzing plan modification is based at least in part on an efficacy value, the efficacy value calculated based at least in part on a volume of a region within a data space containing the modifications and a probability that the region includes a tamper-resistant kernel data structure, the region at least containing the fuzzing plan modification.

15. The system of claim 13, wherein the measure of value of the fuzzing plan modification is based at least in part on a diversity value, the diversity value calculated based at least in part on a volume of a region within a data space containing the modifications and one or more of: a count of the modifications within the region, a count of modifications within the data space, or a random value.

16. A non-transitory computer-readable storage medium having stored thereon executable instructions that, when executed by one or more processors of a computer system, cause the computer system to at least:
receive information specifying one or more kernel data structures;
monitor a plurality of virtual machines to determine one or more unviable virtual machines, each virtual machine of the plurality of virtual machines including one or more modifications of a set of modifications to one or more target memory locations, the target memory locations selected based at least in part on the one or more kernel data structures; and
provide information specifying one or more tamper-resistant kernel data structures, the one or more tamper-resistant kernel data structures selected from the one or more kernel data structures based at least in part on one or more of the one or more unviable virtual machines.

17. The non-transitory computer-readable storage medium of claim 16, wherein the instructions that cause the computer system to monitor the plurality of virtual machines further include instructions that, when executed by the one or more processors, cause the computer system to instantiate one or more additional virtual machines, the one or more additional virtual machines instantiated based at least in part on the one or more unviable virtual machines.

18. The non-transitory computer-readable storage medium of claim 16, wherein the instructions that cause the computer system to monitor the plurality of virtual machines further include instructions that, when executed by the one or more processors, cause the computer system to remove one or more modifications from the set of modifications based at least in part on a penalty function associated with one or more characteristics of the one or more kernel data structures.

19. The non-transitory computer-readable storage medium of claim 18, wherein the penalty function is based at least in part on a count of a number of kernel data structures.

20. The non-transitory computer-readable storage medium of claim 18, wherein the penalty function is based at least in part on a correlation measurement between each of the kernel data structures and one or more of the one or more tamper-resistant kernel data structures, the correlation measurement based at least in part on the one or more unviable virtual machines.

\* \* \* \* \*